Sept. 20, 1966  E. NECKENBÜRGER  3,274,516
FERRITE DEVICES FOR THE MODULATION AND SWITCHING OF MICROWAVES
Filed May 25, 1965  2 Sheets-Sheet 1

INVENTOR.
ERNST NECKENBURGER
BY
Frank R. Trifari
AGENT

Sept. 20, 1966  E. NECKENBÜRGER  3,274,516
FERRITE DEVICES FOR THE MODULATION AND SWITCHING OF MICROWAVES
Filed May 25, 1965  2 Sheets-Sheet 2

INVENTOR.
ERNST NECKENBURGER
BY

AGENT

United States Patent Office 3,274,516
Patented Sept. 20, 1966

3,274,516
FERRITE DEVICES FOR THE MODULATION AND SWITCHING OF MICROWAVES
Ernst Neckenbürger, Hamburg-Stellingen, Germany, assignor to North American Philips Company, Inc., New York, N.Y., a corporation of Delaware
Filed May 25, 1965, Ser. No. 458,704
Claims priority, application Germany, Mar. 21, 1960,
P 24,656, P 24,657
13 Claims. (Cl. 332—51)

This invention relates to devices for phase modulating, amplitude modulating or switching microwaves, and more particularly to devices for this purpose which employ a member of ferrite material. This application is a continuation-in-part of application Serial No. 86,895, filed February 3, 1961, now abandoned, and application Serial No. 91,435, filed February 24, 1961, now abandoned.

Devices for phase modulating microwaves by ferrites which may be influenced magnetically are known. In most cases such devices consist of a waveguide for conducting the microwave radiation, and a ferrite positioned within this guide. A magnetic coil is provided outside the waveguide, the field of the coil passing through the walls of the waveguide.

If, however, in such an arrangement, the phase is to be modulated with high frequencies (exceeding 10 kc./s.), the omnidirectionally closed walls of the waveguide screen the modulation energy to an increasing extent as the modulation frequency increases. In order to reduce this screening effect, previous devices have been provided with very thin waveguide walls (i.e. of the order of magnitude of microns) or the waveguide walls have been provided with gaps or similar apertures.

Such arrangements, in particular with modulation frequencies of the order of magnitude of megacycles, require increased modulation energy and hence involve considerable cost. In addition, they have the drawback that gaps and other apertures may easily result in reflections and radiations of the microwave energy.

According to one embodiment of the present invention, a phase modulator is provided in which the ferrite bar is sufficiently thick to conduct a microwave dielectrically and a metal plate is provided at such a distance from the ferrite bar that rotation of the polarization plane of the microwaves is prevented. The modulation coil provided coaxially to the ferrite bar also encloses the metal plate. The diameter of the coil exceeds the transverse field extension of the microwave, so that high frequency phase modulation of microwaves is possible with small cost and small modulation energy. This result is achieved owing to the fact that a ferrite bar larger than a given minimum cross-section operates as a dielectric wave guide. As a result, limiting of the microwave radiation by metal members may be omitted for a large part without the occurrence of radiation or reflection losses. Both the phase velocity and also the direction of polarization of the microwave conducted dielectrically by the ferrite is strongly influenced by a longitudinal magnetic field. While, according to this embodiment of the invention, the variation of the phase is desired, the rotation of the polarization plane (Faraday rotation) causes an undesired effect in connection with the aim of the device. This effect is avoided by providing a conducting plate at a suitable distance from the ferrite bar.

Devices for amplitude modulation and switching of microwaves with a rectangular waveguide provided with a ferrite bar which may be influenced by a magnetic field, are also known. Insofar as these devices use ferromagnetic resonance phenomena in magnetically saturated ferrites, they require strong magnetic fields and considerable control power, so that the use of higher modulation frequencies and shorter switching times is hindered. In addition, the steepness of the modulation characteristic and the bandwidth of the modulator and switch are highly dependent on the line width of the ferrite material used.

It is possible to control ferrite losses for amplitude modulation and switching purposes by magnetic fields havings magnitudes in the range below the magnetic saturation of the ferrite. In this case, comparatively smaller control fields may be used, but in order to obtain larger damping, considerable ferrite volumes are required. However, the latter favor the production of higher modes of extension in the ferrite structure of the waveguide, which results in strong reflections of the energy supplied and consequent non-linearities of the modulation characteristic.

According to another embodiment of the present invention, an amplitude modulation device is provided comprising a ferrite bar which is tapered at its two ends and consisting of two longitudinal halves engaging one another with the interposition of a resistance foil parellel to the wider side of the wave guide. The bar is positioned coaxially to the wave guide and parallel to the external magnetic field. This arrangement renders it possible to use comparatively smaller modulation power and small ferrite volumes.

While the resistance foil orientated at right angles to the electric lines of force of an applied $TE_{10}$ wave causes no absorption without a magnetic field set up, a monotonously increasing damping of the microwave energy through the foil takes place with increasing longitudinal magnetization of the ferrite. This occurs substantially reflection-free owing to the rotation of plane of polarization suppressed in the rectangular waveguide at small cross-section of the bar. Another advantage of the arrangement is that the use of high modulation frequencies and shorter switching pulses is possible.

In order that the invention may be more clearly understood, several embodiments will now be described, by way of example, with reference to the accompanying drawings, in which.

Figure 1:
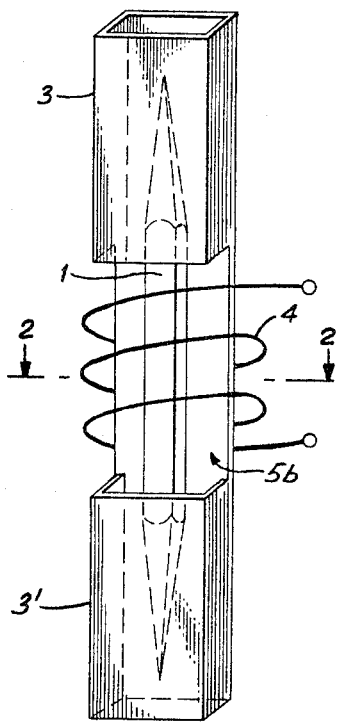
FIG. 1 is a perspective view of a phase modulation device according to one embodiment of the invention.
Figure 2:
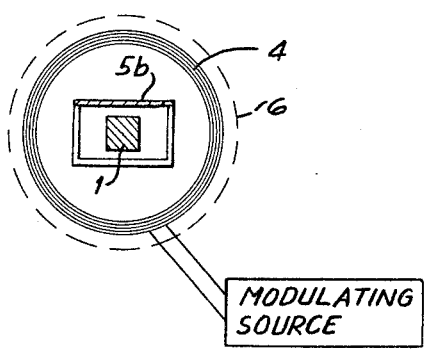
FIG. 2 is a cross-sectional view of the device of FIG. 1 taken along the lines 2—2.

Referring now to FIGS. 1 and 2, therein is illustrated a phase modulation device according to the invention, comprising a ferrite bar 1. A conducting plate 5b is provided spaced from one side of the bar, and a modulating coil 4 surrounds the bar and conducting plate. The ends of the conducting plate 5b may be connected to rectangular waveguides 3 and 3'.

The optimum cross-sectional dimension of the ferrite bar 1 of the phase modulator of FIGS. 1 and 2, which need not necessarily be square, can best be determined empirically. For example, the optimum dimensions of the bar can be determined by obtaining phase shift-applied field characteristics of the device as a function of the dimensions of the bar, as described by Reggia et al., "Proceedings of the IRE," Nov. 1957, pages 1510–1517. It is of a size which depends on the operating frequency, the dielectric constant and the saturation magnetization of the ferrite material. If the transverse proportions are too large, Faraday rotation occurs in spite of the metal plate 5b. If they are too small, the transverse field extension will become too strong. In both cases reflections and radiation losses are apt to occur when incorporating the modulation device in other microwave circuits.

The connecting plate 5b is provided in order to impose certain electric limiting conditions upon the microwave and consequently prevent Faraday rotation. Therefore, its distance from the ferrite bar as a rule is smaller than the diameter of the bar, and its width two or three times larger than the diameter of the bar. In the embodiment of the invention shown in FIGS. 3 and 4, a second conductive plate 5a is provided symmetrically to the first plate. This arrangement results in a reduction of the transverse field extension, and only small attenuation of the modulation-energy.

The arrangement described in FIGS. 1 to 4 permit the high-frequency modulation of the phase by the longitudinal field of a coil 4 provided coaxially to the ferrite bar without the modulation energy being screened by omnidirectionally closed wave guide walls. Limitations are imposed upon the modulation frequency only by losses in the ferrite itself. The coil radius is larger than the transverse extension radius of the microwave radiation. To avoid effects from external radiation, the whole arrangement may be enclosed in a cylindrical metal screen 6. The coil may be mounted by suitable supports (not shown) on the waveguide wall.

Figure 3:
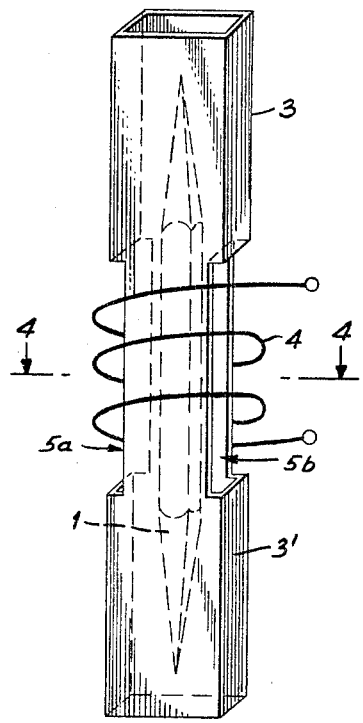
FIG. 3 is a perspective view of another embodiment of a phase modulation device according to the invention.

In order to employ microwave devices such as shown in FIGS. 1 to 4 in conventional waveguide systems employing rectangular waveguides, it is necessary to adapt the modulation device in a reflection-free manner to the commonly used standard wave guide of a rectangular cross-section. This may be done in a simple manner by tapering the ends of the ferrite bar 1 as shown in FIGS. 1 and 3, the bar being sufficiently long to protrude coaxially into the rectangular wave guide. The metal plates join the wide walls of the wave guide in a jointless manner.

The supports for the ferrite bar 1 are not shown. They may be manufactured for example from polyfoam and positioned to support the ferrite bar centrally within the wave guide at the ends of the bar. With constructions as shown in FIGS. 1 and 3 and tapered ferrite bars of approximately 7 mm. thick and 130 mm. long made from Mi-Cu-Mn and Mn-Al ferrites, phase shifts up to 2000° were obtained at an operating frequency of 9275 mc./s. The required static field strength was smaller than 100 oersted. The reflections amounted to less than 5% with bandwidths of approximately 5%. The modulation characteristic is monotonous, within the linear range, and also shows a saturation variation with the magnetic saturation of the ferrite. When using low-loss ferrites, in particular those with Mg-Mn-components, the operation damping in the whole variation range may be kept below 1db. For high frequency modulation, the superposing of a static biasing field is recommended for adjusting the device to a favorable operation point on its modulation characteristic.

Modulation arrangements as shown in FIGS. 1 to 4 may be incorporated in any microwave circuit according to the known technologies. The more the proportions of the cross-section of circuit and modulation devices are adapted to each other, the lower is the cost. This relates in particular to striplines and dielectric image lines. The effectiveness of the modulation device depends in all the cases on the electric material properties of the ferrite at the operating frequency used. However, considering the known points of view, suitable materials are easy to find among the multiplicity of the microwave ferrites which are on the market.

Figure 5:
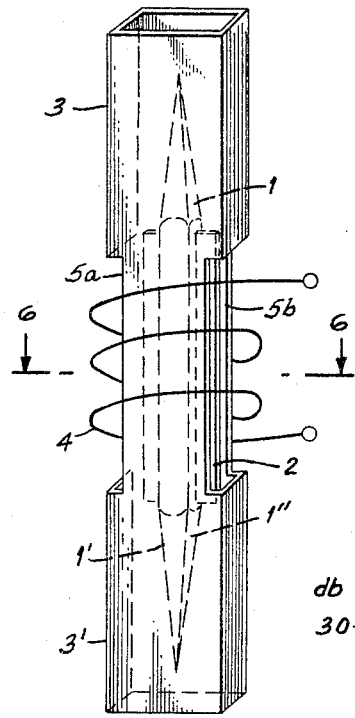
FIG. 5 is a perspective view of an amplitude modulating and switching device according to the invention.
Figure 6:
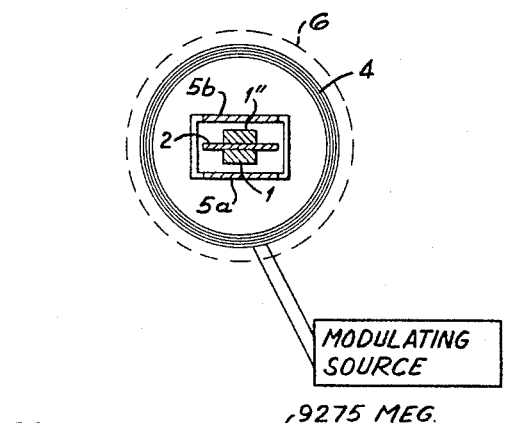
FIG. 6 is a cross-sectional view of the device of FIG. 5 taken along the lines 6—6.

Referring now to FIGS. 5 and 6, therein is illustrated an amplitude modulating and switching device according to the invention, in which the ferrite bar 1 is cut in half longitudinally to provide two halves 1' and 1''. The two halves are separated by a damping foil 2. The device is positioned coaxially between the rectangular waveguide having sections 3 and 3' so that the electric lines of force of an $TE_{10}$ wave supplied to the waveguide are at right angles to the foil 2. The mounting means for the ferrite bar 1 are not shown. They may be manufactured, for example, from polystyrol foam (polyfoam) and may support the ferrite bar centrally or at the ends. The central part of the ferrite bar is provided in a magnetic coil 4 and enclosed by the screen 6.

The real properties of this device may be explained by means of a simplified model. A flat wave traverses a gyromagnetic medium with electric anisotropy, and the medium strongly absorbs all the electric field components at right angles to the E-vector of the incoming wave. Calculations show that, in the case of sufficient magnetization of such medium in the direction of extension, propagation is only possible in the form of an elliptical wave which experiences a strong loss damping dependent on the magnetization.

The arrangement employs neither a resonance effect nor the Faraday rotation. It is of the wide band type and is capable of operating in principle also in conduction structures with purely transverse fields (band conduction, etc.).

Figure 7:
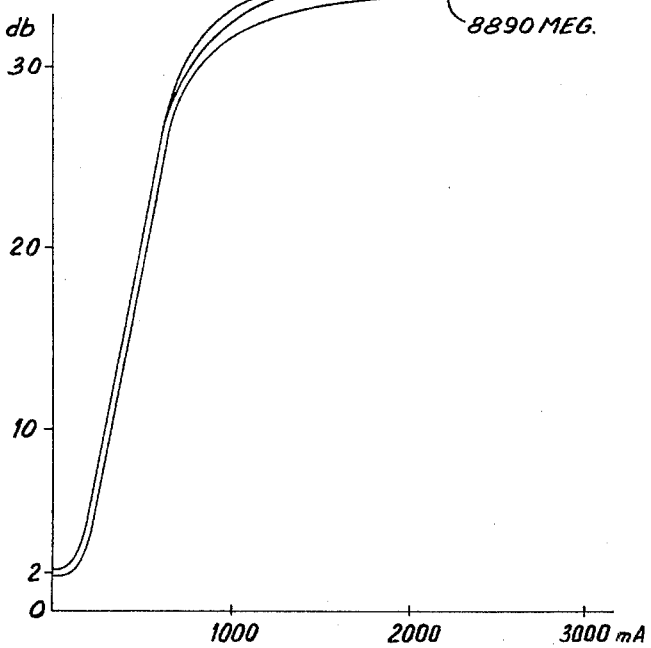
FIG. 7 is a diagram illustrating the modulation characteristics of the device of FIGS. 5 and 6.

The damping of such an arrangement increases monotonously and through a large range nearly linearly with respect to the longitudinal magnetic field provided by the magnet coil 4. Modulation steepness and saturation damping generally increase with the proportions of both the ferrite bar and also of the foil and with the dielectric constant and the saturation magnetization of the ferrite and, in addition, with the specific surface conductivity of the foil material. It is noted in this connection that a monotonous saturation characteristic as shown in FIG. 7 was in general obtained only when the cross-section of the bar does not exceed a size such that Faraday rotation occurs. The magnetic control field is plotted on the abscisca of the curve shown in FIG. 7, and the damping of the microwave energy in db is plotted on the ordinate. When the critical cross-section is exceeded, the characteristic no longer varies monotonously, but shows extreme values. In the choice of the surface conductivity of the foil it is of importance that the thickness of the foil maintains the order of magnitude of the depth of penetration of the microwave. Otherwise, interference phenomena at the output of the arrangement will result.

Figure 4:
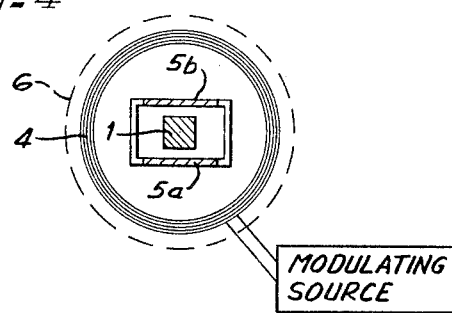
FIG. 4 is a cross-sectional view of the device of FIG. 3 taken along the lines 4—4.

If the ferrite bar is sufficiently thick, without exceeding the critical cross-section, a part of the walls of the wave guide 5a and 5b may be omitted on the basis of the field concentration effect (FIGS. 3 and 4). In a favorable case even three of the walls, that is to say, all of the walls except the wall 5a or the wall 5b may be omitted. However, for adaption to the $TE_{10}$ wave, the tapered ends of the bar 1 should extend in the waveguide portions 3 and 3'. In this arrangement, high modulation frequencies and short switching pulses are not screened by omnidirectionally closed walls of the waveguide. The modulation characteristic and the operation damping are not affected significantly by the removal of the waveguide walls. The remaining wall parts 5a and 5b may be narrowed somewhat, if desired.

To obtain low fundamental damping, the bar should be provided in a central position as accurately as possible and the foil should be parallel to the wide walls of the wave guide.

When using conventional rectangular waveguides, good results were obtained with bars made from Ni-Cu-Mn and MnAl-ferrite materials 5 to 7 mm. thick and 90 to 135 mm. long at an operation frequency of 9275 MHz. Particularly suitable in the X-band are Mg-Mn-ferrites. The length of the tapered ends was 30 to 40 mm. The cross-sections of the bar may be quadratic or cylindrical. It is preferred that the foil consist of graphite paper with a surface resistance of approximately 100 ohm/cm.² and a thickness of approximately 0.1 mm. Saturation values above 40 db are obtainable with field of less than 100 oersted, with fundamental damping below 2 db. The reflection throughout the whole variation range was below 5% with band widths of at least 10% in the X-band. After switching off the saturation field the net attenuation in all the cases appeared to be increased by no more than 0.1–0.3 db.

When excessive modulation steepnesses in the linear part of the characteristic are avoided, the hysteresis phenomena are very small in this case also. When using bars made from low-loss Mg-Mn-ferrites and substantially thinner foils, for example from mica with vapor-deposited tantalum, the fundamental damping may be reduced even further.

What I claim is:

1. A modulation device for high frequency waves comprising a ferrite bar, a source of microwave energy, means applying said microwave energy to said bar, a modulating coil surrounding said bar for providing a longitudinal magnetic field in said bar, a conducting plate extending parallel to said bar inside said coil and spaced from said bar, said plate comprising the sole conductive means between said coil and bar, said first and second rectangular waveguide sections positioned coaxially with said bar, said plate forming an extension of one wall of each of said waveguide sections, said bar having sufficiently large cross-sectional dimensions that said energy is conducted dielectrically without substantial transverse field extension and sufficiently small cross-sectional dimensions that said plate substantially prevents rotation of the polarization plane of waves in said bar.

2. A modulation device for high frequency waves comprising a ferrite bar, a source of microwave energy, means applying said microwave energy to said bar, a modulating coil surrounding said bar for providing a longitudinal magnetic field in said bar, first and second parallel conducting plates extending parallel to said bar on opposite sides of said bar inside of said coil and spaced from said bar, said first and second plates comprising the sole conductive means between said coil and bar, and first and second rectangular waveguide sections positioned coaxially with said bar, said first and second plates forming extensions of opposite walls of each of said waveguide sections, said bar having sufficiently large cross-sectional dimensions that said energy is conducted dielectrically without substantial transverse field extension and sufficiently small cross-sectional dimensions that said plate substantially prevents rotation of the polarization plane of waves in said bar.

3. A modulation device for high frequency waves comprising a ferrite bar having tapered ends, a modulating coil surrounding the central portion of said bar, first and second longitudinally spaced apart aligned waveguide sections surrounding opposite tapered ends of said bar, and conducting plate means spaced between said bar and coil and parallel to said bar whereby said coil remains exposed to at least two sides of said ferrite bar, said bar having sufficiently large cross-sectional dimensions that microwave energy may be conducted dielectrically by said bar without substantial transverse field extension and sufficiently small that said conducting plate means substantially prevents rotation of the polarization plane of waves in said bar.

4. A modulation device for high frequency waves comprising a ferrite bar having tapered ends, a modulating coil surrounding the central portion of said bar, first and second longitudinally spaced apart aligned waveguide sections surrounding opposite tapered ends of said bar, and means preventing substantial rotation of the polarization plane of waves applied to said device without substantially screening modulation energy from said bar, said means comprising a pair of parallel conducting plates extending between said coil and bar and parallel to said bar on opposite sides of said bar, said plates comprising the sole conducting material between said coil and the central portion of said bar, said bar having sufficiently large cross-sectional dimensions that microwave energy may be conducted dielectrically by said bar without substantial transverse field extension and sufficiently small cross-sectional dimensions that said conducting plates substantially prevent rotation of the polarization plane of waves in said bar.

5. The device of claim 4, in which said waveguide sections are sections of a rectangular waveguide, and said conducting plates are extensions of the wide walls of said waveguide sections.

6. A modulation device for high frequency waves comprising a ferrite bar having tapered ends, a modulating coil surrounding the central portion of said bar, first and second longitudinally spaced apart aligned rectangular waveguide sections surrounding opposite tapered ends of said bar, and means preventing substantial rotation of the polarization plane of waves applied to said device without substantially screening modulation energy from said bar, said means comprising a conducting plate extending between said coil and bar and parallel to said bar, said plate comprising the sole conducting material between said coil and the central portion of said bar, said plate forming an extension of a wide wall of at least one of said waveguide sections, said bar having sufficiently large cross-sectional dimensions that microwave energy may be conducted dielectrically by said bar without substantial transverse field extension and sufficiently small cross-sectional dimensions that said conducting plate substantially prevents rotation of the polarization plane of waves in said bar.

7. A microwave amplitude modulation device comprising a rectangular waveguide, a ferrite bar coaxially positioned within said waveguide, said bar having tapered ends, a source of magnetic field positioned externally of said waveguide for providing a variable magnetic field in said bar, said ferrite bar comprising a pair of longitudinal halves, and a planar resistance member disposed between said halves of said ferrite bar, the plane of said resistance member being parallel to the wide walls of said waveguide, the sole conducting material in at least the portion said waveguide adjacent the central portion of said bar being in the plane of at least one of the wide walls of said waveguide, whereby said bar is fully exposed to said source on at least two sides.

8. The modulation device of claim 7, in which the cross-sectional area of said bar is less than the critical area at which Faraday rotation of waves applied to said waveguide occurs.

9. The modulation device of claim 7, in which said resistance member has a thickness of the order of magnitude of the depth of penetration of microwaves applied to said waveguide.

10. A microwave amplitude modulation device comprising a rectangular waveguide, a ferrite bar coaxially positioned within said waveguide, said bar having tapered ends, a coil surrounding said ferrite bar externally of said waveguide for providing a variable longitudinal magnetic field in said bar, and a planar resistance member disposed within said waveguide parallel to the wide walls thereof, said resistance member extending through at least the central longitudinal portion of said ferrite bar, the sole conducting material in at least the portion of said waveguide adjacent the central portion of said bar being in the plane of at least one of the wide walls of said waveguide whereby said bar is fully exposed to said source on at least two sides, the cross-sectional area of said bar being less than the critical area at which Faraday rotation of waves applied to said waveguide occurs.

11. A microwave amplitude modulation device comprising a rectangular waveguide, a ferrite bar coaxially positioned within said waveguide, said bar having tapered ends, a coil surrounding said ferrite bar externally of said waveguide for providing a variable longitudinal magnetic field in said bar, and a planar resistance member disposed within said waveguide parallel to the wide walls thereof, said resistance member extending through at least the central longitudinal portion of said ferrite bar, at least the portion of said waveguide within said coil having sole a pair of wide walls.

12. The modulation device of claim 11, in which the width of the wide walls in said portion of said waveguide is less than the width of the wide walls in the adjoining portions of said waveguide.

13. A microwave amplitude modulation device comprising a rectangular waveguide, a ferrite bar coaxially positioned within said waveguide, said bar having tapered ends, a coil surrounding the central portion of said ferrite bar externally of said waveguide for providing a variable longitudinal magnetic field in said bar, and a planar resistance member disposed within said waveguide parallel to the wide walls thereof, said resistance member extending through at least the central longitudinal portion of said ferrite bar, at least the portion of said waveguide within said coil having solely a single planar wide wall.

References Cited by the Examiner
UNITED STATES PATENTS

| | | | |
|---|---|---|---|
| 2,802,183 | 8/1957 | Read | 332—51 X |
| 2,906,974 | 9/1959 | Reggia et al. | 332—51 X |
| 2,998,579 | 8/1961 | Rizzi | 332—51 |
| 3,103,639 | 9/1963 | Reggia | 332—51 X |

OTHER REFERENCES

Fleri and Duncan: Reciprocal Ferrite Devices in TEM Mode Transmission Lines, IRE Trans. on MTT, January 1958, pp. 92, 93.

HERMAN KARL SAALBACH, *Primary Examiner.*

P. L. GENSLER, E. LIEBERMAN,
*Assistant Examiners.*